W. MARTIN.
FEED REGULATOR FOR SHELLING AND DEFIBERING MACHINES.
APPLICATION FILED FEB. 27, 1912.

1,097,658.

Patented May 26, 1914.

2 SHEETS—SHEET 1.

W. MARTIN.
FEED REGULATOR FOR SHELLING AND DEFIBERING MACHINES.
APPLICATION FILED FEB. 27, 1912.

1,097,658.

Patented May 26, 1914.

2 SHEETS—SHEET 2.

Witnesses
H. H. Knight
E. M. Fenster

Inventor
Walther Martin
By his attorneys
Knight Bros.

UNITED STATES PATENT OFFICE.

WALTHER MARTIN, OF BITTERFELD, GERMANY.

FEED-REGULATOR FOR SHELLING AND DEFIBERING MACHINES.

1,097,658. Specification of Letters Patent. Patented May 26, 1914.

Application filed February 27, 1912. Serial No. 680,292.

*To all whom it may concern:*

Be it known that I, WALTHER MARTIN, of Bitterfeld, a subject of the King of Prussia, and whose post-office address is Innere Bismarckstrasse No. 72, Bitterfeld, Kingdom of Prussia, German Empire, have invented new and useful Improvements in Feed-Regulators for Shelling and Defibering Machines, of which the following is a specification.

The present invention relates to an arrangement in shelling and defibering machines working with intermittent charge and discharge. According to the present invention it is possible to subject the material to the treatment by the machine for a longer or shorter time without the speed of the working parts (shell and drum) having to be changed, but to vary the speed of the working members relatively to each other, without the duration of the treatment being affected.

The variation of the duration of the treatment and the regulation of the relative speed of the working parts is necessary in consequence of the fact, that products with strongly adhering shells such as barley, maize, pepper and the like or cotton seed with fibrous residues attached to them will require a longer and more intense shelling and defibering treatment than products the shells of which surround the kernels loosely only, such as peas, lentils, beans, rice and the like. On the other hand oblong seeds such as barley, wheat, and the like the points of which must not be injured by the treatment in the machine, necessitate that the shell revolving around the drum has a slower speed than with round seed, so that it produces a rolling movement. In both instances the shelling member must however maintain a constant circumferential speed, which has been ascertained by long years of experiences.

The desired effect is obtained according to the present invention by the revolving shell of the machine actuating a pawl lever coöperating with a ratchet wheel, which lever will according to its adjustment advance the ratchet wheel, which controls the entire operating mechanism of the machine, by 1, 2 or more teeth. Thereby the material under treatment is exposed according to requirement to such treatment for a longer or shorter time without the speeds of the working parts (shell and drum) having to be varied.

Figure 1:
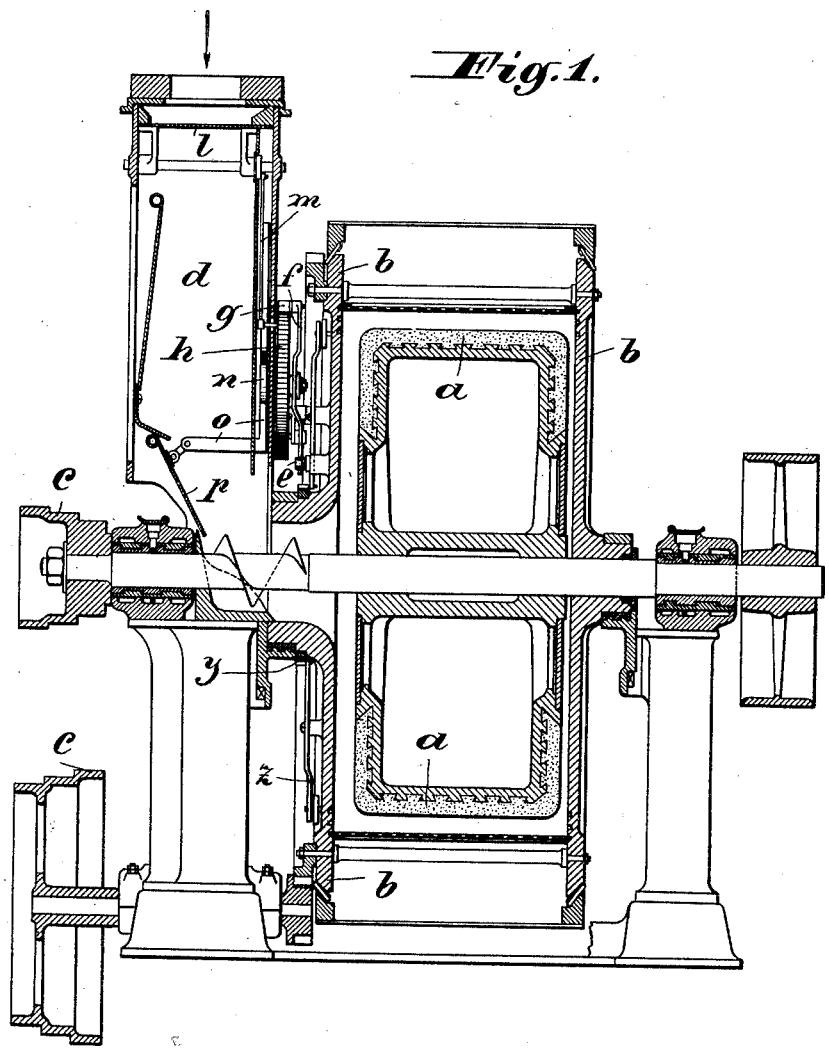
Figure 2:
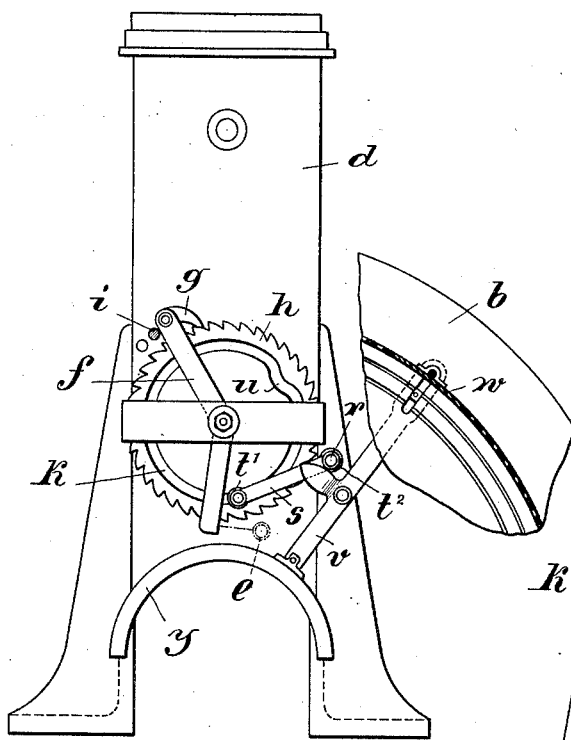
Figure 3:
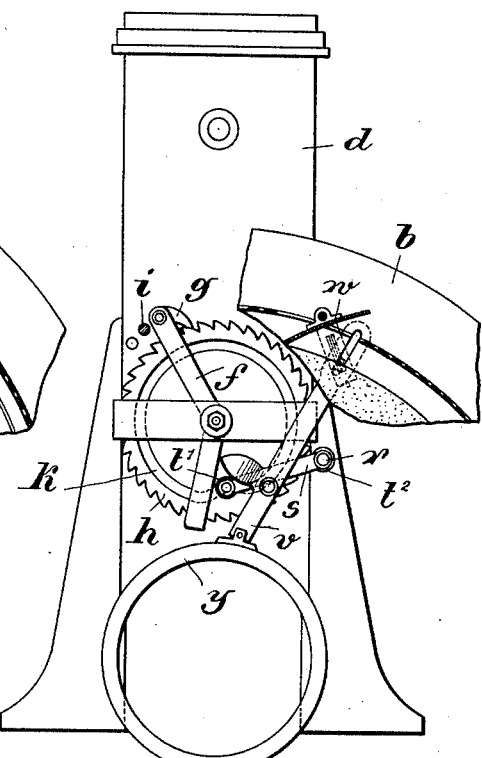
Figure 4:
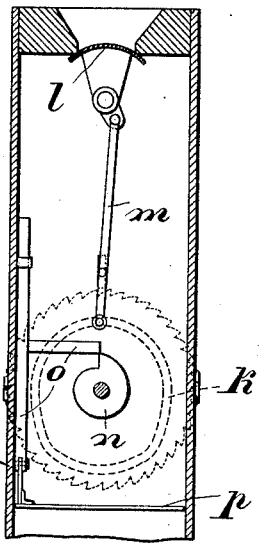
Figure 4:
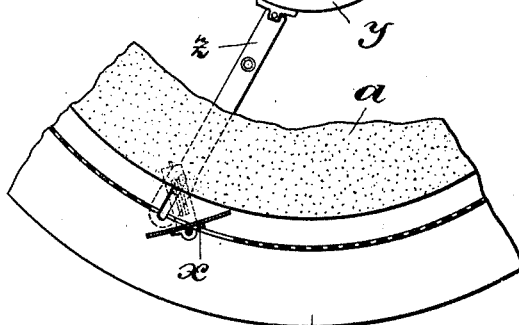

Referring to the drawings:—Figure 1 is a section illustrating the mechanism according to the invention. Figs. 2 and 3 are side elevations of the machine in different positions, and Fig. 4 is a detail section illustrating a feature of the operating construction for admitting the material.

In the constructional form shown in these drawings $a$ is the drum, $b$ is the shell revolving in an opposite direction, $c$ are cone pulleys for varying the speed of these two members, $d$ is the hopper, which will automatically receive the required charges for the machine from a container, and automatically convey such charge to the machine. This charging device and also the automatic discharge of the machine is controlled by a mechanism fitted to the hopper having discharge levers and valves on the revolving shell. On the shell is fitted a stationary roller $e$ which at each revolution of the shell will engage a pawl lever $f$ fitted to the hopper $d$ (see Figs. 2 and 3) and thereby give the said pawl lever an oscillating movement. By the movement of this pawl lever $f$, which has at its upper end a pawl $g$, a ratchet wheel $h$ is advanced by means of an adjustable abutment pin $i$ by one, two or more teeth according to the stroke of the lever $f$. In both sides of the ratchet wheel $h$ are cam grooves $k$ with eccentric indentures, by which the charging and discharging mechanism of the machine is operated. According to the adjustment of the advance of the ratchet wheel by 1, 2 or more teeth or by double indentures in the cam grooves it will be possible to vary the duration of the treatment of the material in the machine within very wide limits without the speed of the machine itself having to be changed. On the other hand it may be necessary, as has been hereinbefore stated, to vary the relative speed of the working parts (shell and drum), and the aforedescribed means will allow to control the charging and discharging periods according to requirement.

The feed into the charging hopper $d$ and from the same into the machine is controlled by a swiveling valve in the top of the hopper (Fig. 4), which valve is positively operated by a lever $m$ controlled by the cam groove on the rear side of the ratchet wheel. To the rear side of the ratchet wheel $h$ is attached a cam disk $n$ or the like, (Fig. 4), on which glides a lever $o$. This cam disk will raise and lower the lower admission valve, thereby closing or opening it respectively. The cam disk is so adjusted, with regard to the upper admission valve, that the latter is closed, as soon as the lower valve $p$ is opened.

The automatic discharge of the machine is operated in the following manner: In the groove $k$ cut into the front face of the ratchet wheel $h$, and having an indenture (Figs. 2 and 3) is guided by means of a stud engaging in said groove a lever $s$ fulcrumed on the pin $r$. Small rollers $t^1$ and $t^2$ turning on pins are provided both at the fulcrum of the lever $s$ and at its guided end. When the ratchet wheel has been advanced by the pawl lever $f$ so far, that the lever $s$ guided in the cam groove $k$ passes the eccentric indenture $u$, the lever $s$ will be raised according to the depth of said indenture $u$, (Fig. 3). In consequence thereof a lever $v$ fitted to the revolving shell of the machine is swung out, which glides with a projecting lug having the shape of a fishbelly over a roller $t^1$ on lever $s$. In consequence of this positive guidance on the roller $t^1$ the lever $v$ will be moved a small distance and will thereby actuate the discharge valve $w$ pivoted within the shell. For more rapidly discharging the machine a second valve $x$ is arranged in the shell diametrically opposite the valve $w$ and operated simultaneously with the first valve by means of the ring $y$ and a second lever $z$. The valves are closed by the lever $v$ passing with its projection beneath the stationary roller $t^2$ of the pin $r$, whereby the lever is returned into its position closing the valves.

For the proper operation of the whole mechanism it is necessary, that the separate mechanisms for operating the various valves namely: 1. for admitting the material to be treated from a container into the hopper of the machine, 2. for admitting the material from the hopper into the machine, and 3. for discharging the machine after the treatment has been completed coöperate in such a manner, that the intervals are adjusted to their minimum length, so as to avoid the machine having to run idle.

What I do claim as my invention, and desire to secure by Letters Patent of the United States, is:—

1. In a machine of the character described, the combination with suitable movable members, of charging and discharging mechanisms for said movable members, a ratchet wheel operatively connected with and actuating said charging and discharging mechanisms, a pawl acting upon said ratchet wheel, means for operating said pawl by one of said movable members, and means for regulating the stroke of said pawl.

2. In a machine of the character described, the combination with suitable movable members, and a charging hopper therefor, of an admission valve for said hopper, a charging valve between said hopper and said movable members, and discharging valves upon one of said working members, a ratchet wheel having cam grooves in both of its side faces, a pawl operating upon said ratchet wheel, a lever supporting said pawl and arranged to be operated by one of said movable members, levers engaging the grooves of said ratchet wheel and suitably connected with said admission and discharging valves, and means for operating said charging valve.

3. In a machine of the character described, the combination with suitable movable members, and a charging hopper therefor, pivoted valves controlling the admission of material into said hopper and from said hopper to said movable members, means for discharging material from said movable members, a pawl and ratchet mechanism driven by one of said movable members, cams operated by said pawl and ratchet mechanism, and levers actuated by said cams and operatively connected with said valves.

4. In a machine of the character described, the combination with suitable movable members, and a charging hopper therefor, of a valve controlling the admission of material into said hopper, a valve controlling the passage of material from said hopper to said movable members, valves controlling the discharge of material from said movable members, a pawl and ratchet mechanism operated by one of said movable members, connections between said pawl and ratchet mechanism and said admission and discharge valves, a cam driven by said pawl and ratchet mechanism, and a lever engaging said cam and connected with the valve between said hopper and said movable members.

5. In a machine of the character described, the combination with suitable movable members, means for supplying material to said movable members, a discharge valve for said movable members, a lever pivotally mounted upon one of said movable members and connected with said discharge valve, a cam projection upon said lever, a ratchet wheel having a cam groove, a second lever operating in said cam groove and coöperating with said cam projection for operating said discharge valve, and means for actuating said ratchet wheel.

6. In a machine of the character described, the combination with suitable movable members, and a charging hopper therefor, means for passing material from said hopper to said movable members, a plurality of discharge valves for said movable members, connected operating levers for said discharge valves and suitable pawl and ratchet mechanism for actuating said connected operating levers.

7. In a machine of the character described, the combination with suitable movable members, and a charging hopper therefor, means for passing material from said hopper to said movable members, a plurality of discharge valves for said movable members, connected operating levers for said discharge valves, a pointed cam projection upon one of said valve operating levers, a ratchet wheel formed with a cam groove, a lever operating in said cam groove and adapted to engage said cam shaped projection, and an intermittently operated pawl for actuating said ratchet wheel.

In testimony whereof I have hereunto set my hand in presence of two subscribing witnesses.

WALTHER MARTIN.

Witnesses:
  HENRY HASPER,
  WOLDEMAR HAUPT.

Copies of this patent may be obtained for five cents each, by addressing the "Commissioner of Patents, Washington, D. C."